United States Patent [19]
Takada et al.

[11] Patent Number: 5,405,303
[45] Date of Patent: Apr. 11, 1995

[54] CONTROL SYSTEM FOR ENGINES AND AUTOMATIC TRANSMISSIONS

[75] Inventors: Mitsuru Takada, Aichi; Jun Harada, Toyota, both of Japan

[73] Assignee: Toyota Jidosha Kabushiki Kaisha, Toyota, Japan

[21] Appl. No.: 187,920

[22] Filed: Jan. 28, 1994

Related U.S. Application Data

[60] Division of Ser. No. 967,732, Oct. 28, 1992, Pat. No. 5,311,794, which is a continuation-in-part of Ser. No. 729,684, Jul. 15, 1991, Pat. No. 5,178,041.

[30] Foreign Application Priority Data

| Jul. 16, 1990 | [JP] | Japan | ................................. 2-187542 |
| Jul. 16, 1990 | [JP] | Japan | ................................. 2-187543 |
| Jul. 16, 1990 | [JP] | Japan | ................................. 2-187544 |
| Dec. 17, 1991 | [JP] | Japan | ................................. 3-353457 |

[51] Int. Cl.$^6$ .......................................... F16H 59/74
[52] U.S. Cl. .................................... 477/163; 477/158
[58] Field of Search .............................. 477/158, 163

[56] References Cited

U.S. PATENT DOCUMENTS 4,194,416 3/1980 Sugasawa ............................ 477/163
4,858,496 8/1989 Iwatsuki et al. ..................... 477/163

FOREIGN PATENT DOCUMENTS 0163952 12/1985 European Pat. Off. .

OTHER PUBLICATIONS

Patent Abstracts of Japan, vol. 12, No. 466 (M-772), Dec. 7, 1988, JP-A-63189641, Aug. 5, 1988.
Patent Abstracts of Japan, vol. 12, No. 73, (M-674), Mar. 8, 1988, JP-A-62215157, Sep. 21, 1987.
Patent Abstracts of Japan, vol. 7, No. 211 (M-243) [1356], Sep. 17, 1983, JP-A-58107822, Jun. 27, 1983.

Primary Examiner—Dirk Wright
Attorney, Agent, or Firm—Oblon, Spivak, McClelland, Maier & Neustadt

[57] ABSTRACT

A control system for controlling both: an engine having a plurality of cylinders, a plurality of intake ports formed individually for the cylinders, a plurality of intake valves for opening or closing the intake ports individually for the cylinders, and a control valve for opening or closing one of the intake ports of each of the cylinders; and an automatic transmission connected to the engine. The control system comprises: a valve controller for opening the control valve, when an engine load is high, and for closing the control valve when the engine load is low: an air/fuel ratio controller for making an air/fuel ratio when the control valve is closed higher than that when the control valve is open; and a shift inhibitor for inhibiting the shift in the automatic transmission till a predetermined time period elapses after the switching of the control valve.

11 Claims, 9 Drawing Sheets

CONTROL SYSTEM FOR ENGINES AND AUTOMATIC TRANSMISSIONS

This is a division of application Ser. No. 07/967,732, filed on Oct. 28, 1992, now U.S. Pat. No. 5,311,794, which is a continuation-in-part application of U.S. patent application Ser. No. 07/729,684, filed Jul. 15, 1991, now U.S. Pat. No. 5,178,041.

BACKGROUND OF THE INVENTION

The present invention relates to a system for controlling both an engine having high torque fluctuations, when the ON/OFF state of a control valve disposed in an intake port is switched, and an automatic transmission connected to the engine.

As is well known in the art, an automatic transmission for vehicles is set to a predetermined one of gear stages when the power transmission path of a gear train is changed by a friction device including clutches and brakes. This friction device has its load (or torque) capacity varied with not only the coefficients of friction and the diameters of friction members but also the pressure of engagement (i.e., the line pressure). This oil pressure is controlled in accordance with the load to be applied to the friction device. When in shifting, on the other hand, not only the engine speed but also the speeds of various rotating members such as gears also vary. For this shift, therefore, the friction device is caused to slip by changing the oil pressure applied to them gently for a predetermined time period so that the inertial energy accompanying the change in the rotational speeds may be absorbed to prevent an abrupt change in the torque of an output shaft, namely the shift shocks.

The aforementioned engagement pressure is controlled through a change in the level of pressure regulation by applying a pilot pressure corresponding to the engine load to a regulator valve for regulating the oil pressure generated by a hydraulic pump. Specifically, either the throttle pressure to be fed from a throttle valve having its regulation level varied by a throttle cam or the throttle pressure sent from a linear solenoid valve to be controlled according to the throttle opening is applied as the pilot pressure to the regulator valve to change the regulation level. On the other hand, the oil pressure for engaging the friction device may be controlled when in shifting by applying either the oil pressure (i.e., the line pressure) regulated by the aforementioned regulator valve or the oil pressure coming from an accumulator control valve to the back pressure chamber of an accumulator. Incidentally, an example of changing the regulation level by using the linear solenoid valve is disclosed in Japanese Patent Laid-Open No. 215157/1987.

In the aforementioned ordinary control method existing in the prior art, the line pressure will rise as the throttle opening increases, so that the torque capacity of the friction device is augmented whereas the oil pressure in shifting remains at a relatively high level. If, on the contrary, the throttle opening decreases so that the engine torque falls, the line pressure also drops, and then the engagement or release of the friction device in shifting is timed, as expected, not to deteriorate the shift shocks.

Incidentally, the engine connected to the automatic transmission does not always have its output torque changed continuously. In case, therefore, the engine torque change is discontinuous, special controls are required.

The engine falling in this category can be exemplified by the (lean combustion) engine which adopts a lean combustion system, as disclosed in Vol. 38, No. 9 of "Automobile Technology". In this lean combustion engine, an improvement in the fuel economy under a light load and a high output under a high load are made compatible by keeping an air/fuel ratio at a high level while the throttle opening is at or below a predetermined level (i.e., under the light load). In a lean range (having a higher air/fuel ratio), however, it is required to stabilize the combustion in the engine cylinder and to improve the combustion efficiency. For this requirement, the bisected intake port has its one half shaped into a helical swirl port and its other equipped with a control valve (e.g., a swirl control valve, as will be abbreviated into "SCV"). Under a light load, this swirl control valve is closed to establish a swirling flow in the cylinder to ensure the lean combustion. Since, however, the suction is restricted with the swirl control valve being closed, a sufficient output performance is achieved at a throttle opening larger than a predetermined value (i.e., under a high load) by opening the swirl control valve and by reducing the air/fuel ratio to the stoichiometric level or the power level.

Figure 14:
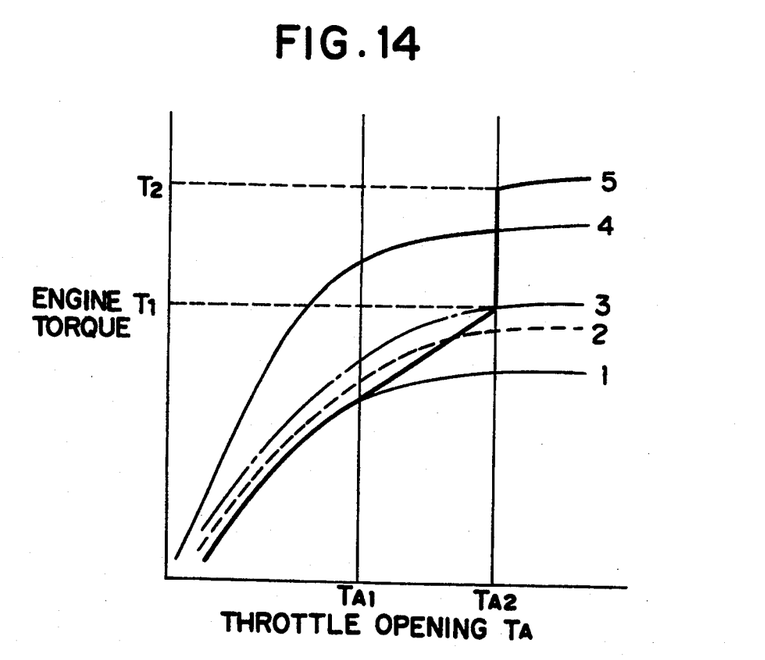
FIG. 14 is a diagram plotting the output characteristics of the lean combustion engine which is equipped with the swirl control valve.

FIG. 14 is a diagram plotting the relations between the output torque of the aforementioned lean combustion engine and the throttle opening. A thick solid line appearing in FIG. 14 indicates the actual engine torque. Moreover, a line ① indicates the torque characteristics when the air/fuel ratio is as high as 21 for the lean combustion, in which the aforementioned swirl control valve is closed. On the other hand, a line ② or ③ indicates the torque characteristics for a relatively lean combustion having an air/fuel ratio of 17 or 16. Moreover, a line ④ indicates the torque characteristics for the stoichiometric combustion having an air/fuel ratio of 14.5. Still moreover, a line ⑤ indicates the torque characteristics for the power combustion having an air/fuel ratio of about 12.5.

As shown in FIG. 14, the aforementioned lean combustion engine is subjected to a lean combustion, in which the air/fuel ratio is set at about 21 with the throttle opening $T_A$ being no higher than $T_{A1}$, as indicated in FIG. 14. The engine torque is continuously increased by changing the air/fuel ration gradually to 7 or 16 while the throttle opening $T_A$ is at a level between $T_{A1}$ and $T_{A2}$ of FIG. 14. When the throttle opening $T_A$ exceeds $T_{A2}$, the engine torque in the wide opening range is retained partly by opening the swirl control valve and partly by reducing the air/fuel ratio to the power level. In the burning state having the swirl control valve opened, however, the engine torque is discontinuously changed together with the air/fuel ratio between $T_1$ and $T_2$, as seen from FIG. 14.

In the prior art, however, the switching of the ON/OFF of the swirl control valve and the shift of the automatic transmission are accomplished independently of each other. In case these operations take place simultaneously, the shift shocks are intensified due to the overlap of the changes in both the engine torque caused by switching the swirl control valve and the output shaft torque caused by the inertial torque in shifting. In case, moreover, the swirl control valve is switched, the engine torque is highly changed even if the throttle opening does not change, as has been described hereinbefore. In the conventional method, by which the line pressure and the accumulator back pressure are controlled according to the throttle opening, these two pressures will become unsuitable for the engine torque (or the input torque to the automatic transmission). As a result, if a shift occurs in this state, its shocks may grow excessive, and still the worse the friction members may lose their durability.

In an engine enabled to change its output characteristics by changing an air/fuel ratio, on the other hand, the air/fuel ratio is reduced to stabilize the combustion if the engine water temperature is low. If the depression rate of an accelerator pedal is high, the air/fuel ratio may be reduced so as to provide high output characteristics. In this engine, at least two output characteristics can be set for one throttle opening. If, therefore, the line pressure of the automatic transmission or the engagement pressure of the friction device is regulated on the basis of the throttle opening, the oil pressure may relatively drop to intensify the shift shocks.

SUMMARY OF THE INVENTION

A major object of the present invention is to prevent the shift shocks of an automatic transmission which is connected to an engine having a discontinuously changing output torque.

Another object of the present invention is to improve the durability of the friction device of the automatic transmission which is connected to the engine having its output torque changed discontinuously.

Still another object of the present invention is to provide a system capable of properly controlling both an engine equipped with a control valve for controlling the ON/OFF of one of intake ports formed in each cylinder and an automatic transmission connected to the engine.

In order to achieve these objects, the control system of the present invention is provided with means for inhibiting the shift in the automatic transmission for a predetermined time period in case the ON/OFF state of the control valve is switched to cause the discontinuous change in the output torque. In this structure, the shift is not executed before the oil pressure grows suitable for the engine torque. As a result, it is possible to prevent the shift shocks and the excessive slippage of the friction device.

In accordance with another structure of the present invention, the control system is provided with regulation level change means for changing the regulation level of the oil pressure in accordance with either the ON/OFF state of the control valve for causing the discontinuous change in the output torque or the increase in the engine output characteristics based upon a running state. The structure can be modified such that the control valve for causing the discontinuous change in the output torque is switched after the regulation level has been changed. With these structures, neither the shift shocks are intensified, not does the friction device slip excessively, because the oil pressure of the automatic transmission is suited for the output torque after the control valve has been switched.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the present invention.

DETAILED DESCRIPTION OF THE PREFERRED EMBODIMENTS

Figure 1:
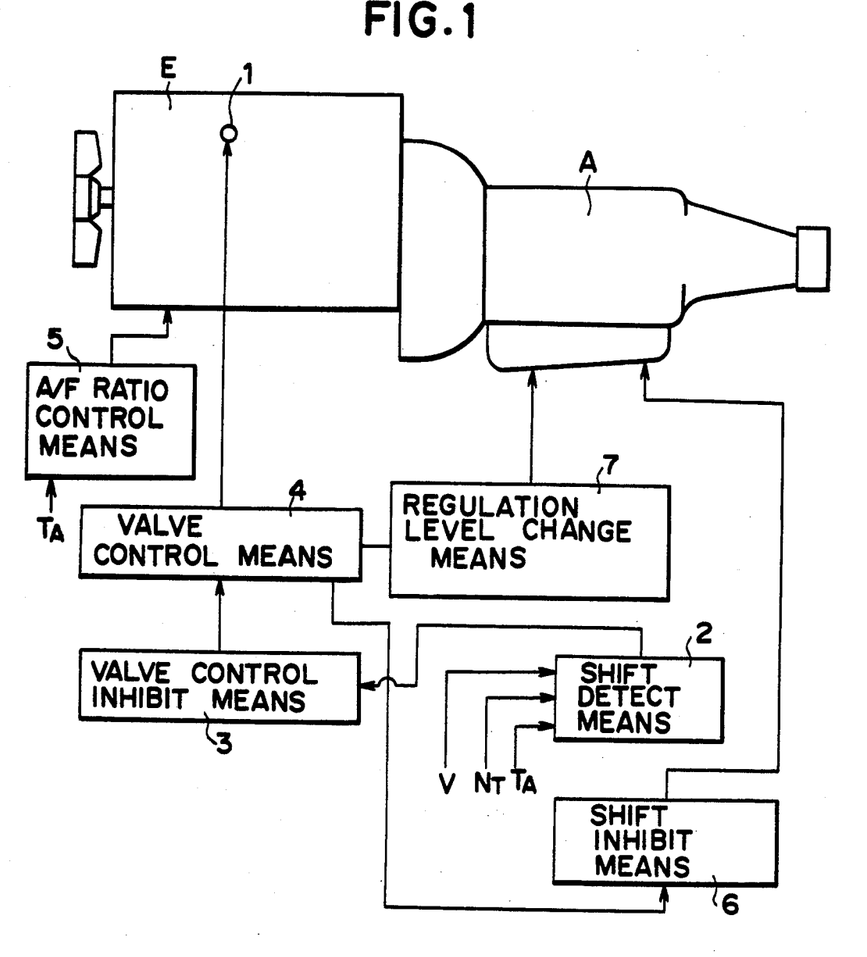
FIG. 1 is a block diagram showing a basic structure of the control system according to the present invention.
Figure 2:
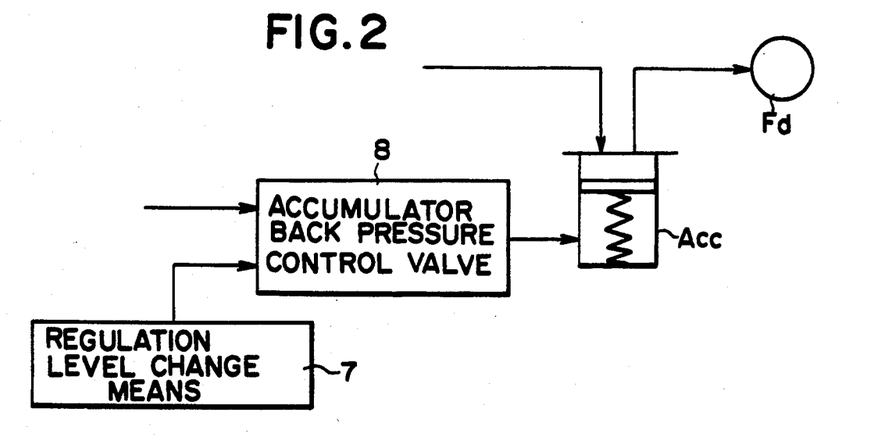
FIG. 2 is a schematic diagram showing one example of pressure regulating means.

First of all, a basic structure will be described in the following. In FIG. 1, an engine E is of the type in which each cylinder is formed with a plurality of intake ports and in which a control valve 1 is disposed in any of the intake ports so that the engine torque may be discontinuously changed by switching the ON/OFF state of the control valve 1. This engine E is exemplified by the lean combustion engine which is equipped with the aforementioned swirl control valve. To this engine E, there is connected an automatic transmission A for executing one of shifts. This shift execution is detected by shift detect means 2. This shift detect means 2 detects the shift execution in terms of signals such as a vehicle speed V, a throttle opening $T_A$ or a turbine speed $N_T$, and outputs its signal to valve control inhibit means 3. This valve control inhibit means 3 inhibits the change or switching of the ON/OFF state of the control valve 1 in the engine E in response to the shift execution signal coming from the shift detect means 2. A valve control means 4 is set to open the control valve 1 if the throttle opening $T_A$ is above a predetermined value, and to close the valve 1 if the throttle opening $T_A$ is below that value. There is also provided air/fuel ratio control means 5 for controlling the air/fuel ratio in accordance with the engine load and accordingly the ON/OFF of the control valve 1. Specifically, the air/fuel ratio control means 5 increases the air/fuel ratio if the control valve 1 is closed, and decreases the air/fuel ratio if the control valve 1 is open. With the aforementioned valve control means 4, there are connected shift inhibit means 6 and regulation level change means 7. Of these, the shift inhibit means 6 inhibits the shift execution of the automatic transmission A while the valve control means 4 is executing the switching of the control valve 1, even if it is decided that a shift be executed in accordance with changes in the vehicle condition such as the vehicle speed V or the throttle opening $T_A$. On the other hand, the regulation level change means 7 changes the regulation level of the oil pressure in the automatic transmission A. Specifically, the automatic transmission A is equipped, as schematically shown in FIG. 2, with a friction device Fd to be engaged by the oil pressure, an accumulator Acc connected with the friction device Fd, and an accumulator back pressure control valve 8 for controlling the back pressure of the accumulator Acc. These accumulator Acc and accumulator back pressure control valve 8 constitute together the pressure regulate means. This pressure regulate means has its specific structure disclosed in "LEXUS LS400 1990 New Car Feature" (which is published by Toyota Motors), for example. Moreover, the regulation level change means 7 is constructed to change the regulation level by changing the pilot pressure of the accumulator back pressure control valve 8.

In the control system shown in FIG. 1, therefore, the switching of the ON/OFF state of the control valve 1 in the engine E is decided and executed in terms of the throttle opening and the intake vacuum. On The other hand, the shift in the automatic transmission A is decided and executed according to the throttle opening $T_A$ and the vehicle speed V, for example. A shift is detected, if executed An the automatic transmission A, by the shift detect means 2 so that this means 2 is outputted to the valve control inhibit means 3. Then, this valve control inhibit means 3 inhibits the switching of the ON/OFF state of the control valve 1 even if the engine state such as the throttle opening or the intake vacuum is such as to switch the ON/OFF state of The control valve 1. As a result, the discontinuous change in the engine torque is not caused in the course of the shift so that the shift shocks can be prevented from becoming worse.

If, on the other hand, it is decided by the valve control means 4 in terms of the throttle opening $T_A$ and so on that the ON/OFF state of the control valve 1 be switched, the regulation level change means 7 changes the regulation level of the oil pressure in the automatic transmission A, i.e., the back pressure of the accumulator Acc, and the valve control means 4 then switches the ON/OFF state of the control valve 1. After the switching of the ON/OFF state of the control valve 1 has been executed, the shift inhibit means 6 inhibits the shift at the automatic transmission A till a predetermined time elapses.

In case, therefore, the control valve 1 is switched to change the engine torque discontinuously, the oil pressure in the automatic transmission A has already been changed so that the friction device Fd can be prevented from having insufficient force due to low torque and accordingly from slipping. Since, moreover, the switching of the control valve 1 and the shift are prevented from occurring simultaneously, no high shift shock will be caused. In case, still moreover, the oil pressure is controlled in accordance with the output of the engine E, the shift is not executed before the oil pressure is varied by changing the engine output in accordance with switching of the control valve 1. As a result, the friction device Fd has its torque capacity suited for the torque applied to the friction device Fd. As a result, it is possible to prevent the excessive slippage of the friction device Fd and the shift shocks.

Figure 3:
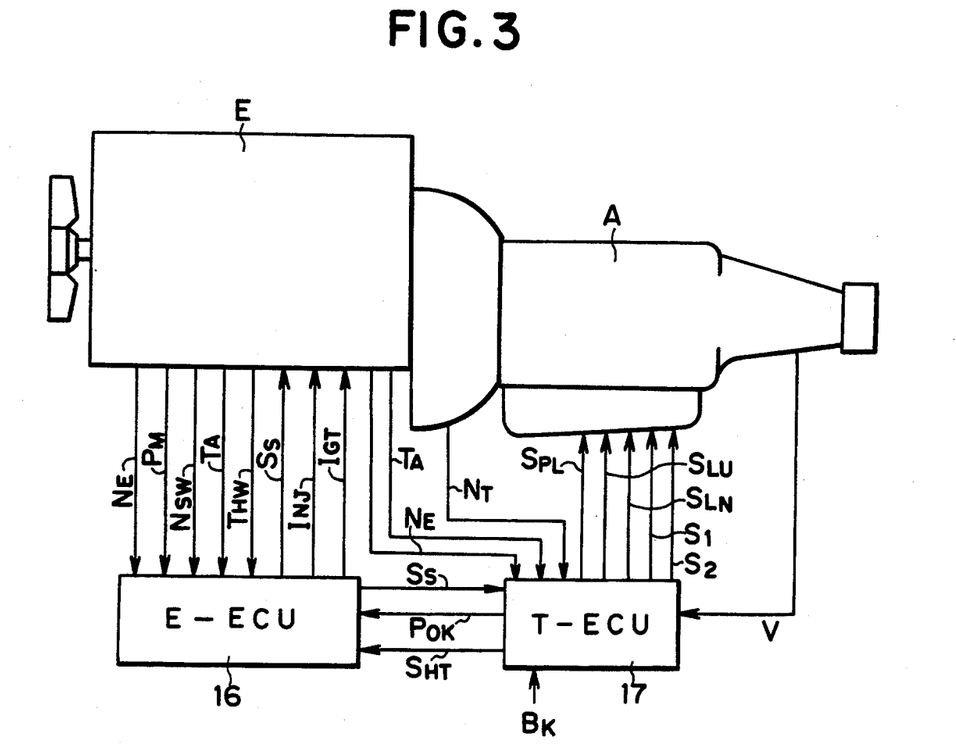
FIG. 3 is a diagram showing the structure of a control system according to one embodiment of the present invention.
Figure 4:
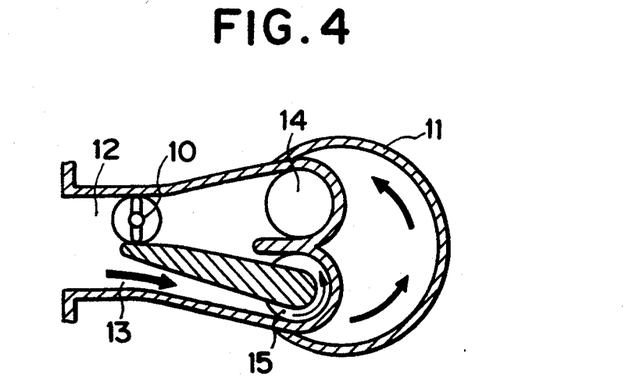
FIG. 4 is a schematic diagram showing a swirl control valve combustion engine.

FIG. 3 shows a more specific structure, as will be described in connection with the engine E and the automatic transmission A connected to the former in accordance with the present invention. The engine E is constructed to have its output torque changed discontinuously by the control valve disposed in the air intake system, as will be exemplified by a swirl control valve 10 shown in FIG. 4. As shown, one cylinder 11 is equipped with two intake ports 12 and 13 and two intake valves 14 and 15. The one intake port 12 is equipped with the swirl control valve 10 for opening or closing it. If the swirl control valve 10 is closed, the intake air will flow, as indicated by arrows in FIG. 4, into the cylinder 11 to establish a strong swirl while turning about the stem of the one intake valve 15. If the swirl control valve 10 is opened, on the contrary, the intake air flows into both intake ports 12 and 13. In the engine E thus constructed, the air/fuel ratio is controlled together with the control of the intake air by the swirl control valve 10. Specifically, a lean combustion is effected under a low load by increasing the air/fuel ratio and by closing the swirl control valve 10. Under a high load, on the contrary, a stoichiometric combustion is effected by setting the air/fuel ratio to the stoichiometric value and by opening the swirl control valve 10. As a result, the engine E can achieve the aforementioned torque characteristics, as indicated by the thick solid line in FIG. 10.

In FIG. 3, reference numeral 16 designates an electronic control unit (as will be abbreviated into "E-ECU") for controlling the engine E. This electronic control unit 16 is made receptive of signals including an engine speed $N_E$, an intake manifold vacuum $P_M$, a neutral switch signal $N_{SW}$, the throttle opening $T_A$ and an engine water temperature $T_{HW}$ to output signals including a signal $S_S$ for controlling the swirl control valve 10, a fuel injection signal $I_{NJ}$ and an igniter signal $I_{GT}$.

On the other hand, the automatic transmission A has a well-known structure, in which it can set one of gear stages by means of the friction device including clutches and brakes and can freely control the control pressure such as the line pressure or the accumulator back pressure in an electric manner by means of the linear solenoid valve. This automatic transmission A is controlled by an electronic control unit (as will be abbreviated into "T-ECU"). This electronic control unit 17 is made receptive of signals including the vehicle speed V, the engine speed $N_E$, the turbine speed $N_T$, the throttle opening $T_A$ and a brake signal $B_K$ to output its signals to a line pressure controlling solenoid valve $S_{PL}$, a lock-up solenoid valve $S_{LU}$, an accumulator back pressure solenoid valve $S_{LN}$ and shift solenoid valves $S_1$ and $S_2$.

The electronic control units 16 and 17 described above are electrically connected with each other for the following operations. In case the automatic transmission A is executing the shifting operation, the electronic control unit 17 therefor outputs a signal $S_{HT}$ to the electronic control unit 16 for the engine E so that the latter unit 16 inhibits the switching of the ON/OFF state of the swirl control valve 10.

On the other hand, the electronic control unit 16 for the engine E outputs a signal $S_S$ indicating the ON/OFF state of the swirl control valve 10, and the electronic control unit 17 for the automatic transmission A then outputs a signal $P_{OK}$ indicating the end of setting the line pressure and the accumulator back pressure.

The oil pressures such as the line pressure and the accumulator back pressure in the automatic transmission A are controlled on the basis of two kinds of maps. In case the swirl control valve 10 changes between its OFF and ON states, the engine torque discontinuously changes, and the torque also changes generally in a manner to correspond to the throttle opening. Thus, the electronic control unit 17 for the automatic transmission A controls the oil pressure by using the following maps interchangeably: either a two-dimensional map M1 dictated by the throttle opening and the engine speed with the swirl control valve 10 being closed or a one-dimensional map M1 dictated by the intake manifold vacuum; and either a two-dimensional map M2 dictated by the throttle opening and the engine speed with the swirl control valve 10 being opened or a one-dimensional map M2 dictated by the intake manifold vacuum.

Next, the shift inhibiting control in accordance with the switching of the swirl control valve 10 will be described in the following with reference to FIGS. 5A to 5D.

Figure 5A:
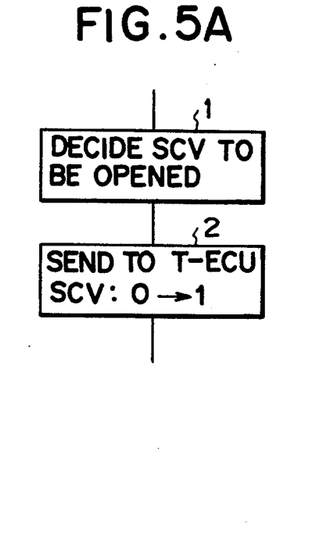
FIGS. 5A to 5D are flow charts showing a control routine for inhibiting a shift while the swirl control valve is being switched.
Figure 5B:
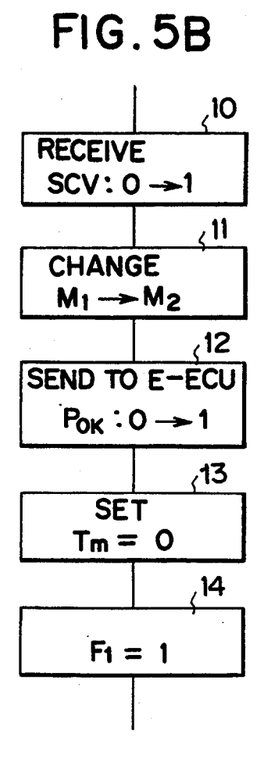
Figure 5C:
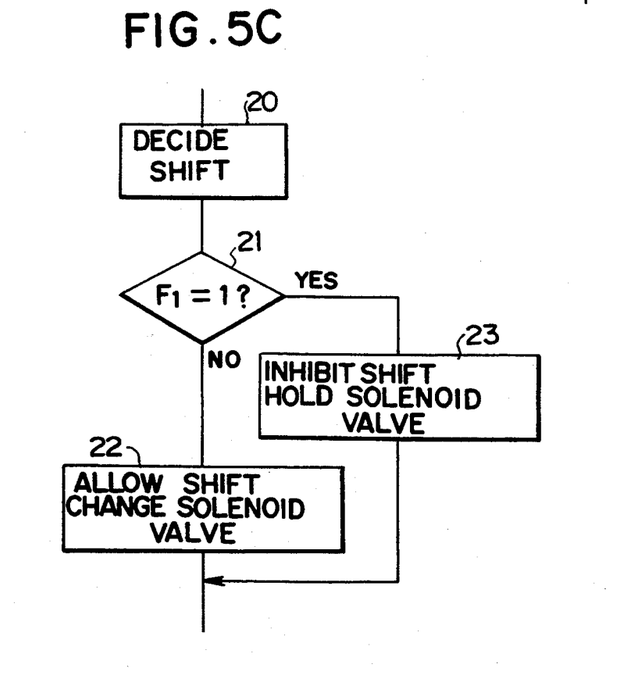
Figure 5D:
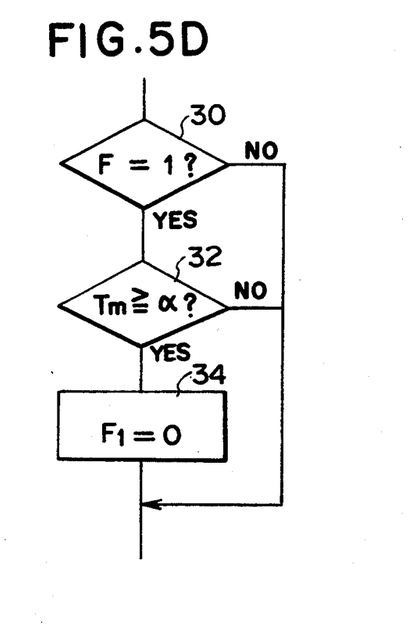
Figure 6A:
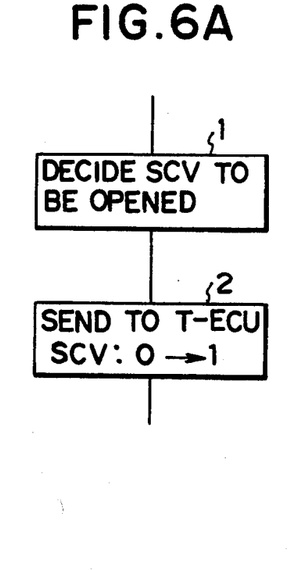
FIGS. 6A to 6D are flow charts showing a control routine for changing the regulation level when the swirl control valve is switched.
Figure 6B:
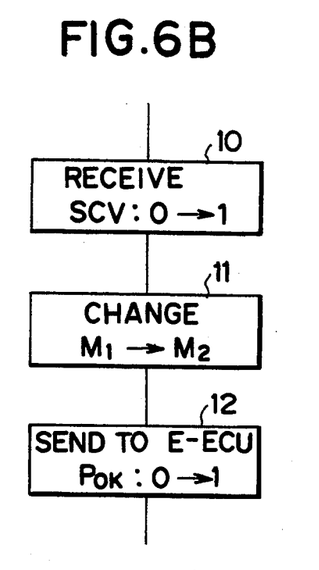
Figure 6C:
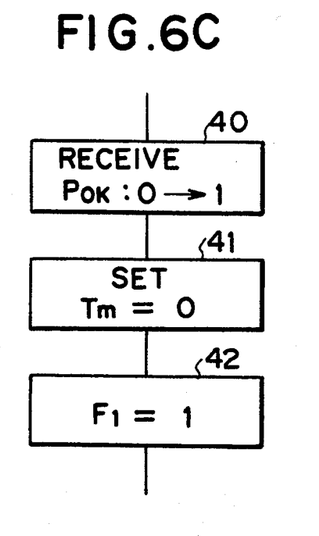
Figure 6D:
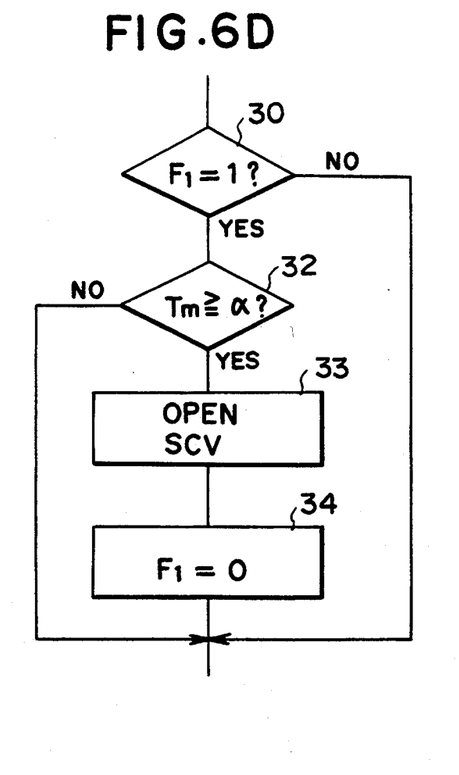

As shown in FIG. 5A, it is decided (at Step 1) by the electronic control unit 16 according to the throttle opening $T_A$ that the swirl control valve 10 should be switched from its closed to open states. Then, the electronic control unit 16 sends (at Step 2) a signal "SCV:0→1" indicating the execution of the decision to the electronic control unit 17 for the automatic transmission A. If, on the other hand, this electronic control unit 17 receives (at Step 10) the signal "SCV:0→1", it changes (at Step 11) the map for controlling the line pressure and the accumulator back pressure from the aforementioned map M1 to M2, and outputs not only a command signal for changing the control of the oil pressure based on the map M2, i.e., the regulation level of the oil pressure but also (at Step 12) the signal "$P_{OK}$:0→1" indicating the start of changing the regulation level to the electronic control unit 16 for the engine E. Next, a timer Tm is set at Step 13, and the flag F1 indicating that the timer Tm is counting the time period is set (at Step 14) to "1". In this state, the shift is decided (at Step 20 of FIG. 5C), and it is decided (at Step 21) whether or not the flag F1 is at "1". If NO, it means that the counting operation of the timer Tm has been completed, namely that the preset time has elapsed from the outputting of the command signal for changing the regulation level of the oil pressure. Then, the shift is allowed (at Step 22), and the signal is outputted to the necessary shifting solenoid valve to execute the shift. If the answer of Step 21 is YES, on the other hand, it means that the timer Tm is in the course of the counting operation and that the preset time has not elapsed yet from the outputting of the command signal for changing the regulation level of the oil pressure. Then, the shift is inhibited (at Step 23), and the individual shifting solenoid valves are held as they are. In the routine (of FIG. 5D) for controlling the counting operation of the timer Tm, moreover, it is decided (at Step 30) whether or not the flag F1 is at "1". If YES, it is decided (at Step 32) whether or not the counted value of the timer Tm is at a preset value $\alpha$. If YES, the flag F1 is reset (at Step 34) to zero. If NO at the decisions of Steps 30 and 32, the routine is returned.

The aforementioned time period $\alpha$ counted by the timer Tm has a duration estimating the delay of the oil pressure in response and is expressed by a constant or a variable according to the oil temperature. Hence, the shift is inhibited till the line pressure or the accumulator back pressure rises to a level according to the map M2. As a result, the oil pressure is suited for the engine torque at the instant for the actual shift, so that neither the shift shocks grow excessive nor the friction members undergo wear.

Incidentally, the controls shown in FIGS. 5A to 5D correspond to the case, in which the swirl control valve 10 is switched from the closed to open states. Despite this fact, however, the system of the present invention can also be applied to the contrary case in which the swirl control valve 10 is switched from the open to closed states.

In the control system of the present invention, the oil pressure level of the automatic transmission A can also be controlled prior to the switching of the ON/OFF of the swirl control valve 10. This control will be exemplified in the following with reference to FIGS. 6A to 6D.

In the electronic control unit 16 for the engine E, more specifically, it is decided (at Step 1) according to the throttle opening $T_A$ that the swirl control valve 10 should be switched from its closed to open states. Then, the electronic control unit 16 sends (at Step 2) the signal "SCV:0→1" indicating the execution of that decision to the electronic control unit 17 for the automatic transmission A. In response to that signal "SCV:0→1" (at Step 10), on the other hand, the electronic control unit 17 interchanges (at Step 11) the map for controlling the line pressure and the accumulator back pressure from the aforementioned map M1 to M2, and outputs not only the command signal for changing the control of the oil pressure, i.e., the regulation level of the oil pressure according to the map M2, but also (at Step 12) the signal "$P_{OK}$:0→1" indicating the start of changing the regulation level to the electronic control unit 16. In response to the signal "$P_{OK}$:0→1" (at Step 40), the electronic control unit 16 sets the timer Tm (at Step 41) and then the flag F1 to "1" (at Step 42). This flag F1 indicates that the preset delay time is being measured. Whether or not the flag F1 is at "1" is decided (at Step 30) in the routine for controlling the ON/OFF of the swirl control valve 10. If NO, the routine is returned. If YES, the routine advances to Step 32, at which it is decided whether or not the time period a has elapsed. If the answer is NO, the routine is returned to await lapse of the time period $\alpha$. If YES, on the contrary, the swirl control valve 10 is switched (at Step 33) from the closed to open states, and the flag F1 is reset to zero (at Step 34).

The aforementioned time period $\alpha$ to be counted by the timer Tm has a duration corresponding to an estimate delay of the oil pressure in response and is a constant or a variable according to the oil temperature. As a result, the rise of the line pressure or the accumulator back pressure to a level according to the map M2 is timed with the increase of the engine torque to be caused by opening the swirl control valve 10.

According to the controls thus far described, the oil pressure is controlled according to the map M1 when the engine is under a light load with the swirl control valve 10 being closed. Under a heavy load with the swirl control valve 10 being open, the oil pressure is controlled according to the map M2 for the higher regulation level. As a result, the oil pressure is stepwise varied in accordance with the stepwise fluctuations of the engine torque so that it can correspond to the engine torque. Thus, it is possible to prevent the deterioration of the shift shocks and the excessive wear of the friction members in advance.

Moreover, the swirl control valve 10 is switched after the predetermined time period has elapsed after the output of the command signal for interchanging the maps, i.e., for changing the regulation level. As a result, less influences are produced due to the delay of the oil pressure in response. Thus, it is also possible to prevent the deterioration due to shift shocks, the excessive wear of the friction members, and the power loss.

Incidentally, the decision of the timing for switching the swirl control valve is based upon the switching decision of the engine output characteristics. Therefore, the controls of the shift inhibition and the change of the regulation level can be accomplished on the basis of the decision of the switching timing of the engine output characteristics in place of the decision of the switching timing of the ON/OFF states of the swirl control valve.

Figure 7:
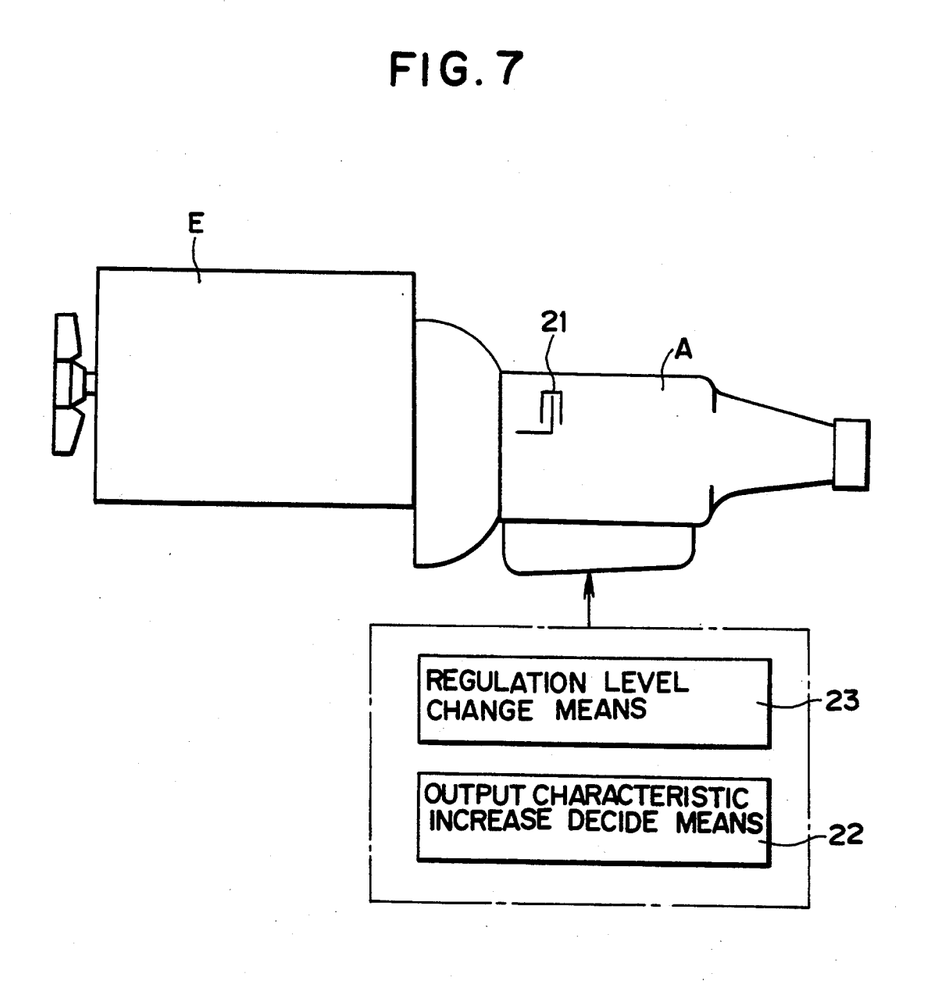
FIG. 7 is a block diagram showing a basic structure of another embodiment of the present invention.

One example of this modification will be described in the following. The automatic transmission A, as shown in FIG. 7, is connected to the engine E which is enabled to establish a plurality of output torques for a throttle opening by changing the output characteristics in accordance with the running state. At the same time, the automatic transmission A can control the regulation level of the oil pressure for engaging a friction device 21. Moreover, a control unit C is equipped with: output characteristic increase decide means 22 for deciding the change of the output characteristics of the aforementioned engine E from low to predetermined high power characteristics in accordance with a change in the running state; and regulation level change means 23 for changing the aforementioned regulation level to a level corresponding to the predetermined high power characteristics before the output characteristics of the engine E is switched to the predetermined high power characteristics.

The output characteristics of the engine E are changed in accordance with the running state such as the cooling water temperature of the engine or the depression rate of the accelerator pedal and may take a high torque even for an identical throttle opening. The switching to the high power characteristics according to the change of the running state is decided by the output characteristic increase decide means 22. With this decision, the regulation level change means 23 changes the regulation level of the oil pressure for engaging the friction device 21 of the automatic transmission A to the predetermined high level prior to the change in the characteristics of the engine E. As a result, the regulation level of the automatic transmission A has taken a high value when the input torque to the automatic transmission A is increased by switching the output characteristics of the engine E to the high characteristics. Thus, the friction device 21 can be prevented from having a torque capacity insufficient for the torque loaded thereon, thereby to eliminate an excess slippage or a durability drop in shifting.

Figure 8:
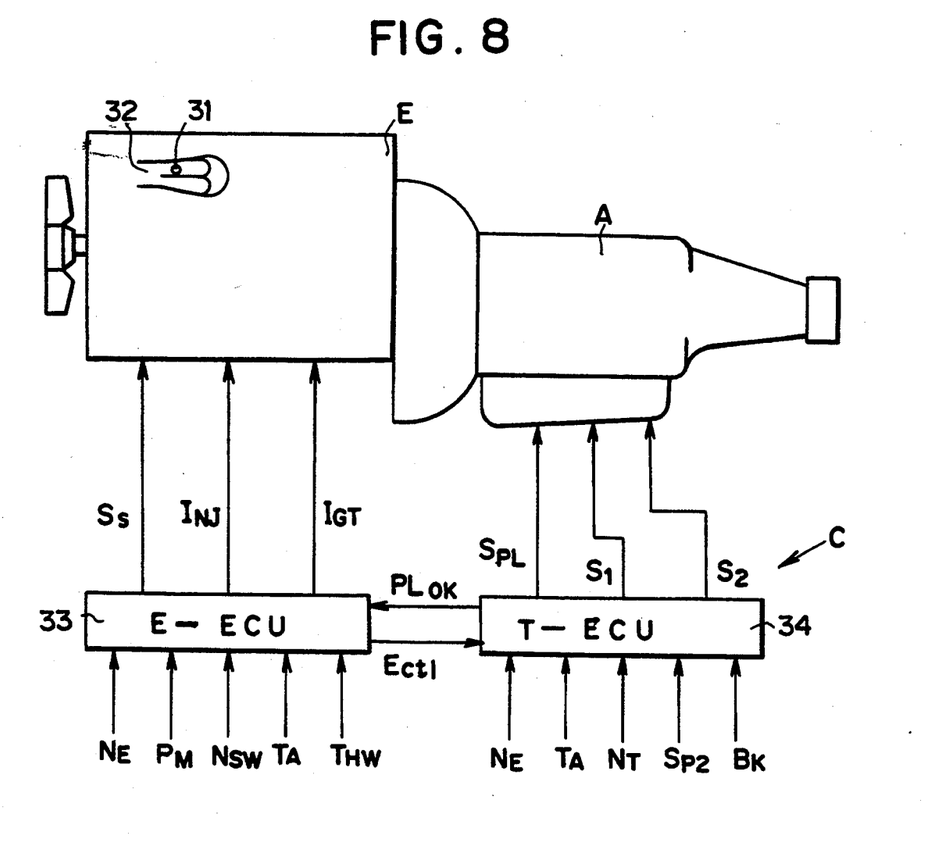
FIG. 8 is a block diagram showing the embodiment of FIG. 7 more specifically.

A more specific example is shown in a block diagram in FIG. 8. The engine E having the automatic transmission A connected thereto can effect combustions both at a high air/fuel ratio (for the lean combustion) and at a lower air/fuel ratio (for stoichiometric and power combustions). Thus, the engine E is equipped in an intake passage 32 with a control valve 31 for smoothing those combustions. This control valve 31 is specifically exemplified by a swirl control valve for establishing an intense swirl in an engine cylinder when it is closed.

On the other hand, the automatic transmission A to which the present invention is applied is constructed such that the shift control is effected with the oil pressure only or such that the vehicle speed and the throttle opening are electrically detected to control the oil pressure with electric indicating signals based upon the detection results. The automatic transmission A is also enabled to control the regulation level of the oil pressure (e.g., the line pressure or the servo pressure of the friction device) for engaging friction members such as clutches or brakes, suitably through electric means such as a solenoid valve.

The control unit C for controlling the engine E and the automatic transmission A described above is constructed mainly of a microcomputer and is equipped, for example, with an electronic engine control unit (E-ECU) 33 and an electronic automatic transmission control unit (T-ECU) 34, as shown in FIG. 8. This electronic engine control unit 33 is made receptive of signals including an engine speed $N_E$, an intake manifold vacuum $P_M$, a signal $N_{SW}$ from a neutral switch, a throttle opening $T_A$, an engine water temperature $T_{HW}$ and so on, to output its signals including a control signal $S_S$ for the aforementioned control valve (i.e., the swirl control valve), a fuel injection $I_{NJ}$, an igniter signal $I_{GT}$ and so on.

On the other hand, the electronic control unit (T-ECU) for controlling the automatic transmission A is made receptive of signals including a vehicle speed $S_{P2}$, the engine speed $N_E$, a turbine speed $N_T$, the throttle opening $T_A$, the brake signal $B_K$ and so on, to output its signals to a line pressure controlling solenoid valve $S_{PL}$, shifting solenoid valves $S_1$ and $S_2$ and so on. Moreover, a stoichiometry decide signal $E_{ctl}$ is outputted from the electronic engine control unit 33 to the electronic automatic transmission control unit 34, whereas a regulation level change end signal $PL_{OK}$ is outputted from the electronic automatic transmission control unit 34 to the electronic engine control unit 33.

Figure 9:
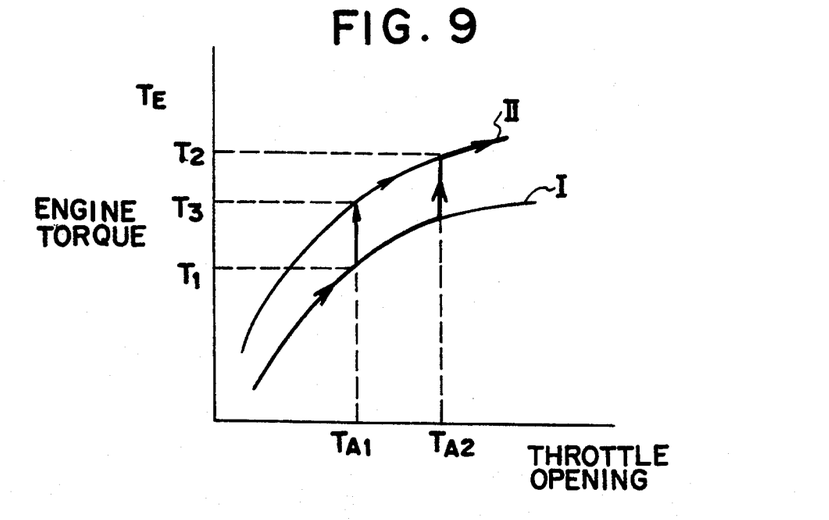
FIG. 9 is a diagram showing one example of the torque characteristics of a lean combustion engine.

The operations of the system thus constructed will be described in the following. The lean combustion engine has its air/fuel ratio controlled on the basis of the throttle opening, as schematically shown in FIG. 9. In the state of a throttle opening $T_{A1}$, the air/fuel ratio is increased for a lean combustion so that the engine torque $T_E$ changes along characteristic curve I to a value $T_1$. If the throttle opening is increased to $T_{A2}$ ($>T_{A1}$), the air/fuel ratio is decreased to a stoichiometric value, for example, to produce a sufficient output so that the engine torque $T_E$ changes along characteristic curve II. Thus, although the air/fuel ratio is basically changed for the lean and stoichiometric combustions in accordance with the throttle opening, it is decreased in case the engine water temperature is low or in case a high acceleration is desired by increasing the depression rate of the accelerator pedal. In this case, the engine torque changes along the characteristic curve II to $T_3$ even if the throttle opening is in the state of $T_{A1}$. In case the output characteristics of the engine E are changed in this way, the regulation level is changed in the automatic transmission A so as to establish an oil pressure according to the torque inputted.

Figure 10:
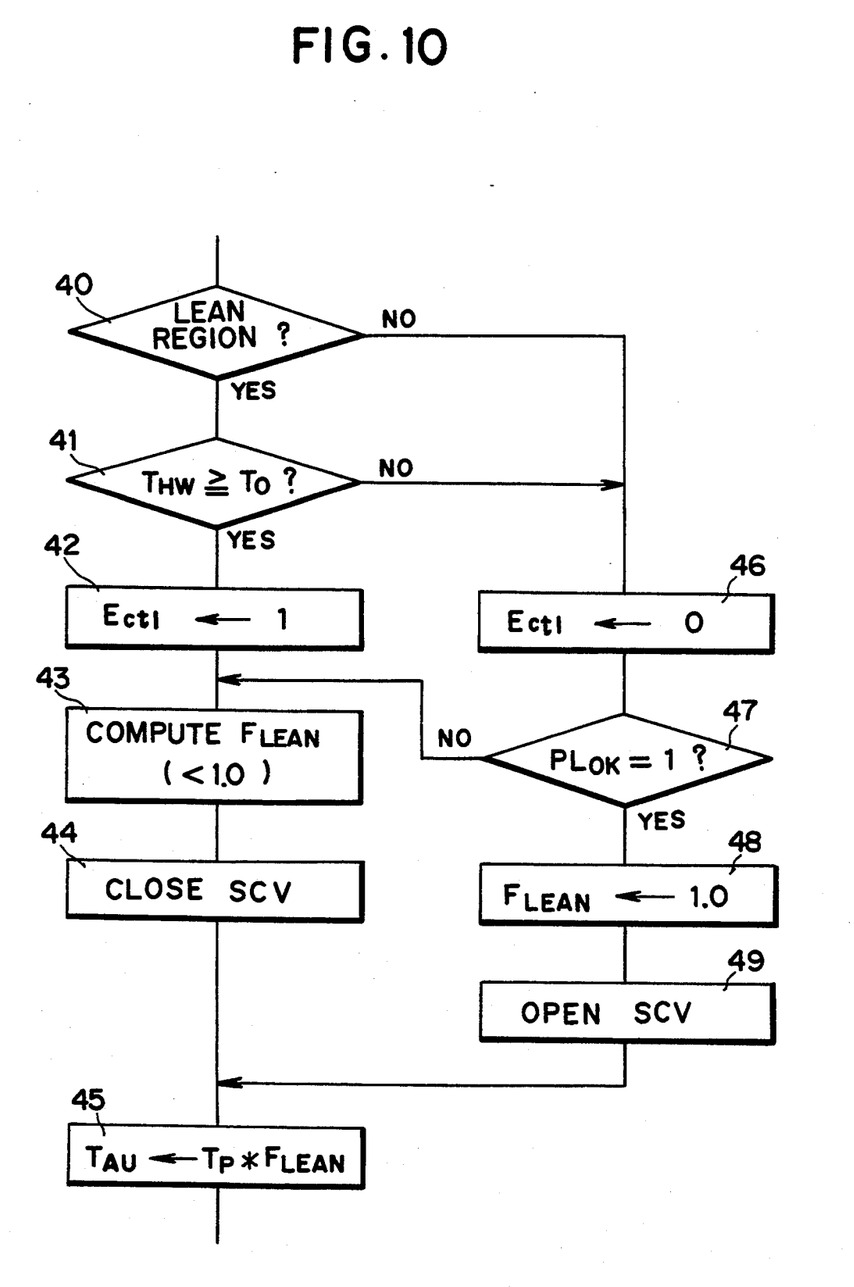
FIG. 10 is a flow chart showing a control routine in case the output characteristics of an engine are changed from low to high characteristics.
Figure 11:
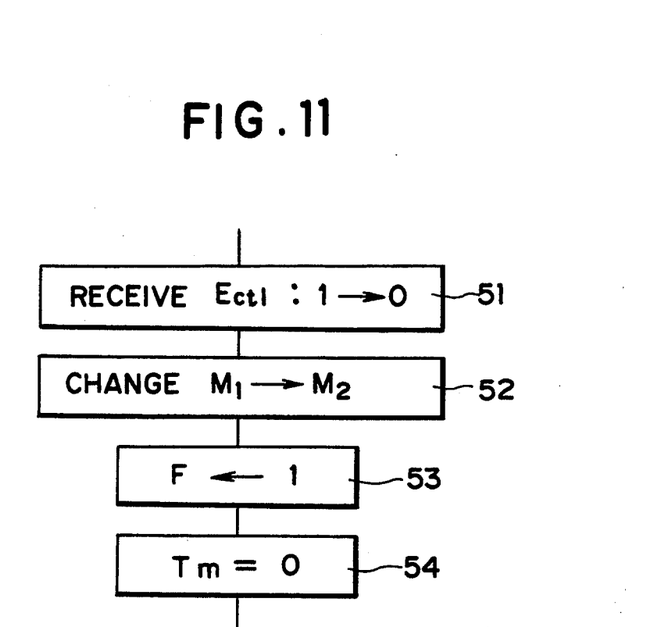
FIG. 11 is a flow chart showing a control routine for raising the regulation level in accordance with a change in the engine output characteristics.
Figure 12:
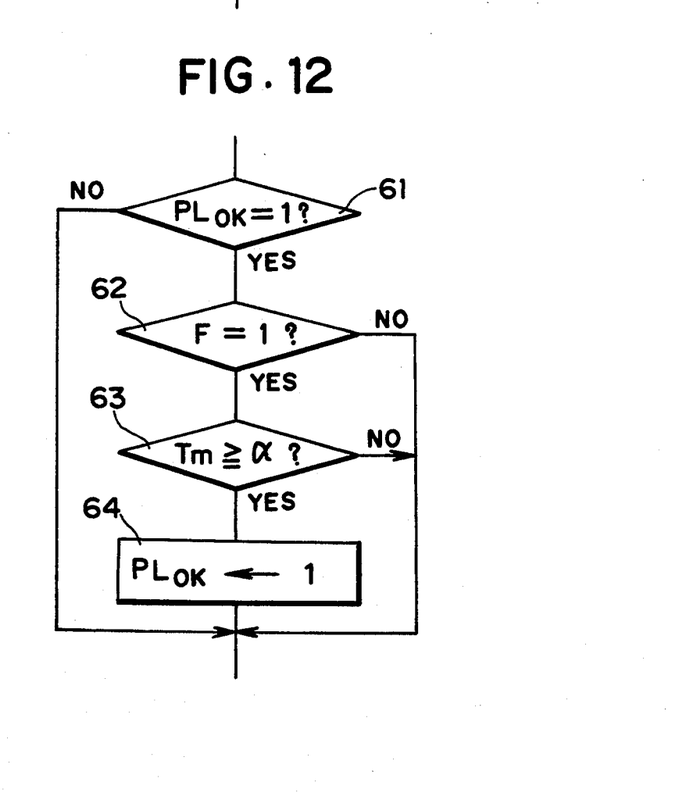
FIG. 12 is a flow chart showing an output delay control routine of a regulation level change end signal.

Specifically, FIGS. 10 to 12 are flow charts showing control routines to be executed in the electronic engine control unit 33 and the electronic automatic transmission control unit 34. First of all, it is decided (at Step 40) in the electronic engine control unit 33 whether or not the running state (e.g., the throttle opening) of the engine E is for the lean combustion (i.e., in the lean region). If the answer is YES, the routine advances to Step 41, at which it is decided whether or not the engine water temperature $T_{HW}$ is equal to or higher than a predetermined reference temperature $T_o$. This reference temperature $T_o$ means that the air/fuel ratio is decreased to the stoichiometric or power air/fuel ratio if the engine water temperature is lower than $T_o$, even if the throttle opening is equal to or smaller than a predetermined opening. If the answer of Step 41 is YES, it is decided that the engine water temperature high enough for the lean combustion. Then, the routine advances to Step 42, at which the decision signal $E_{ctl}$ is set to "1" and sent to the electronic automatic transmission control unit 34. Then, at Step 43, a lean correction coefficient $F_{LEAN}$ is computed. Incidentally, this coefficient has a value smaller than "1.0" because it is for the lean combustion. Moreover, a command signal for closing the swirl control valve (SCV) is outputted at Step 44, and a fuel injection time $T_{AU}$ is determined at Step 45 from a fundamental fuel injection time $T_P$ and the lean correction coefficient $F_{LEAN}$. Here, the fundamental injection time $T_P$ is one for a fuel to be injected for a unit amount of operation (e.g., a predetermined crank angle) and is so see that the air/fuel ratio may be stoichiometric. By multiplying the fundamental injection time $T_P$ by the lean correction coefficient $F_{LEAN}$, therefore, the actual fuel injection time is determined. The lean correction coefficient means that the air/fuel ratio is for the stoichiometric combustion, if it takes "1.0", and that the same is for the lean combustion if it is smaller than "1.0".

If the answers of Steps 40 and 41 are NO, on the other hand, the combustion is undergone at the stoichiometric ratio. In this case, the routine advances to Step 46, at which the decision signal $E_{ctl}$ is set to "0" and sent to the electronic automatic transmission control unit 34. Then, it is decided at Step 47 whether or not the regulation level change end signal $PL_{OK}$ is at "1". This signal $PL_{OK}$ is sent from the electronic automatic transmission control unit 34, as will be described hereinafter, and means, if at "1", that the control for raising the regulation level of the oil pressure in the automatic transmission A has ended. Therefore, if the answer of Step 47 is "NO", the routine is returned to the foregoing Step 43. In short, the lean combustion is undergone in this case. If the answer of Step 47 is "YES", on the other hand, the regulation level has reached a value corresponding to the output torque for the stoichiometric combustion. Thus, the routine advances to Step 48, at which the lean correction coefficient $F_{LEAN}$ is set to "1.0". At Step 49, moreover, a command signal for releasing the SCV is outputted. Then, the routine advances to the foregoing Step 45, at which the fuel injection time $T_{AU}$ is set to one for the stoichiometric combustion.

In the electronic automatic transmission control unit 34, on the other hand, when it is received (at (Step 51) from the electronic engine control unit 33 that the decision signal $E_{ctl}$ has been switched from "1" to "0", as shown in FIG. 11, the map for controlling the line pressure and the accumulator back pressure is switched (at Step 52) from either the two-dimensional map M1 dictated by the throttle opening and the engine speed for the lean combustion or the one-dimensional map M1 dictated by the intake manifold vacuum to the two-dimensional map M2 dictated by the throttle opening and the engine speed for the stoichiometric combustion. And, a command signal for controlling the control oil pressure based on the map M2, i.e., for changing the regulation level of the control oil pressure is outputted. Moreover, the flag F is set to "1" (at Step 53), and a timer Tm is reset (at Step 54) to zero to start the counting.

As shown in FIG. 12, moreover, it is decided (at Step 61) whether or not the regulation level change end signal $PL_{OK}$ is at "1". This signal indicates, if at "1", that the regulation level is high. If the answer of Step 61 is YES, the control of FIG. 12 is ended. If NO, on the other hand, the control advances to Step 62, at which it is decided whether or not the flag F is at "1". If this flag F is at "1", it is meant that a counting of a preset time is executed after the oil pressure control map has been switched to the map M2 for the high level. Therefore, if the answer of Step 62 is NO, the control of FIG. 12 is ended, too. If YES, on the other hand, the control advances to Step 63, at which it is decided whether or not the counted value of the timer Tm exceeds a predetermined value $\alpha$. If this answer is NO, the routine is returned to continue the time counting. If YES, on the other hand, the regulation level change end signal $PL_{OK}$ is set to "1" (at Step 64) and outputted to the electronic engine control unit 33.

In short, after the oil pressure control map has been switched to the map M2 for the high regulation level so that the oil pressure has risen after lapse of the response delay time, the signal of "$PL_{OK}=1$" is outputted to the electronic engine control unit 33. As a result, at the instant when the air/fuel ratio in the engine E is to be switched from the lean to stoichiometric ratios, the regulation level of the oil pressure in the automatic transmission A, i.e., the oil pressure for engaging the Friction device such as a clutch or brake is so high that the friction device can be freed from any excessive slippage even if a shift occurs substantially simultaneously as the output characteristics of the engine E are switched to the high output ones. Even if, moreover, the servo pressure of the friction device is made high by raising the accumulator back pressure, no abutment against the end of the accumulator takes place so that the shift shocks can be eliminated.

Figure 13:
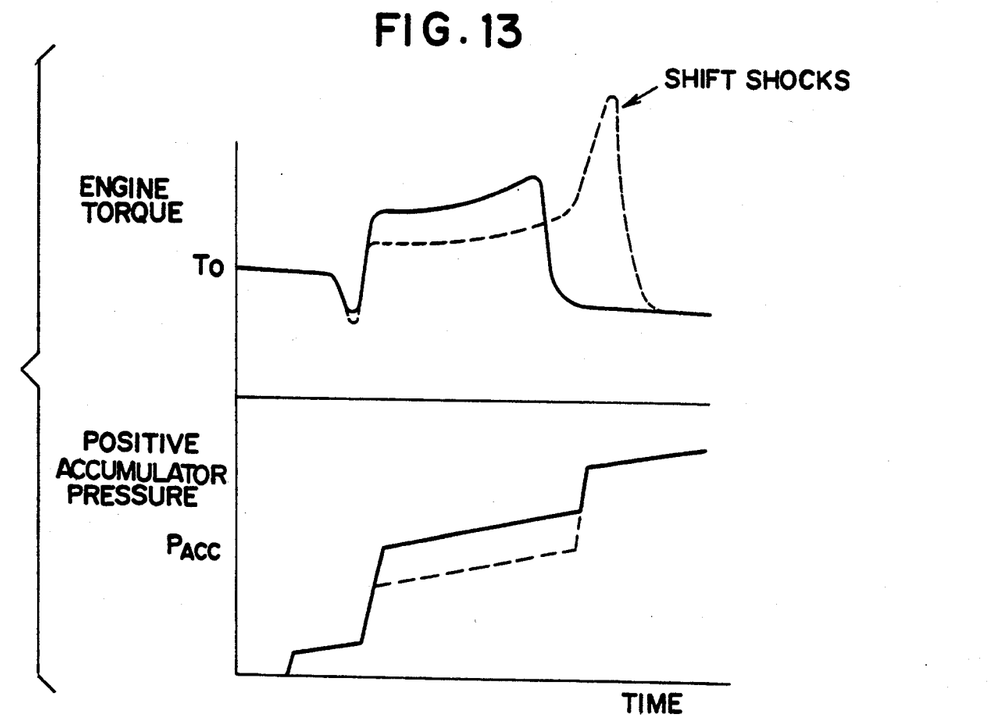
FIG. 13 is a time chart plotting a change in the output torque at a shifting time in case the regulation level is raised and not if the engine output characteristics are changed to high characteristics.

FIG. 13 is a diagram showing the change of the engine torque of the case, in which the servo pressure (in terms of a positive accumulator pressure $P_{ACC}$ in FIG. 13) of the friction device is made high by raising the accumulator back pressure and accordingly the regulation level, in comparison with the case in which the control according to the present invention is not undergone. If the regulation level in the automatic transmission A is raised, as indicated by solid curve in FIG. 13, as the output characteristics of the engine E are switched to the high ones by switching the combustion mode from lean to stoichiometric combustions, the shift is completed within a predetermined time period so that the engine torque changes, as indicated by solid curve, to improve the shift shocks. If, on the other hand, the regulation level in the automatic transmission A is not raised yet to the high level although the shift is caused simultaneously with the rise of the output characteristics, the end abutment of the accumulator occurs before the end of the shift so that the engine torque is seriously changed for a while at the end of the shift thereby to deteriorate the shift shocks. In this case, the friction device is slipping for a long time under a heavy load so that it loses durability.

Here, Step 41 of FIG. 10 may be replaced, if desired, by a step of deciding whether or not the depression rate of the accelerator pedal is higher than a predetermined rate.

The embodiments thus far described are directed to the so-called "lean combustion engine". This engine may also be exemplified by an engine having air/fuel ratio raised by increasing either the amount of intake air or the amount of exhaust gases to be recirculated.

Moreover, the engine to be connected to the automatic transmission and sought for as a target of the present invention should not be limited to the structure in which the intake passage is divided into a plurality of passages, in which the control valve is disposed in one of the divided passages and turned on or off to vary the output torque discontinuously and in which the control valve is the swirl control valve.

The advantages to be obtained by the present invention will be described in the following. Since the engine torque is neither discontinuously fluctuated in the course of shifting the automatic transmission nor is shift in the automatic transmission executed if the engine torque is discontinuously fluctuated, it is possible to prevent serious shift shocks without fail. Moreover, the oil pressure is raised or dropped by having its regulation level changed in the automatic transmission in case the ON/OFF state of the control valve is to be switched. As a result, the oil pressure in the automatic transmission is optimized, even if the engine torque is discontinuously fluctuated, it is possible to prevent the shift shocks and the deterioration of the durability of the friction device, which might otherwise be caused due to the excessive slippage or mistimed engagement of the friction device.

What is claimed is:

1. A control system for controlling both: an engine having a plurality of cylinders, a plurality of intake ports formed individually for said cylinders, a plurality of intake valves for opening or closing said intake ports individually for said cylinders, and a control valve for opening or closing one of the intake ports of each of said cylinders; and an automatic transmission connected to said engine and having friction means to be engaged by an oil pressure regulated by pressure regulation means, comprising:

valve control means for opening said control valve, when an engine load is high, and for closing said control valve when the engine load is low;
air/fuel ratio control means for making an air/fuel ratio when said control valve is closed higher than that when said control valve is open; and
regulation level change means for changing a regulation level by said pressure regulation means in accordance with the ON/OFF state of said control valve.

2. A control system according to claim 1, wherein said pressure regulation means includes an accumulator and an accumulator back pressure control valve, and
wherein said regulation level change means raises the pilot pressure for said accumulator back pressure control valve, when said control valve is open, and drops the same when said control valve is closed.

3. A control system according to claim 1, wherein said valve control means outputs a control valve switching signal to said regulation level change means and switches said control valve after said regulation level change means has changed the regulation level.

4. A control method of controlling both: an engine having a plurality of cylinders, a plurality of intake ports formed individually for said cylinders, a plurality of intake valves for opening or closing said intake ports individually for said cylinders, and a control valve for opening or closing one of the intake ports of each of said cylinders; and an automatic transmission connected to said engine and having friction means to be engaged by an oil pressure regulated by pressure regulation means,
wherein the improvement resides in that a regulation level by said pressure regulation means is changed in accordance with the ON/OFF state of said control valve.

5. A control method according to claim 4, wherein the switching of the ON/OFF state of said control valve is decided so that it is executed after the regulation level has been changed to make the oil pressure suitable for the ON/OFF state after the switching.

6. A control system for controlling both: an engine capable of having its output characteristics changed in accordance with a running state to set a plurality of output torques for one throttle opening; and an automatic transmission having a friction device for setting a gear stage and capable of controlling a regulation level of an oil pressure for engaging said friction device, comprising:

output characteristic increase decide means for deciding a switching of the output characteristics of said engine from low to high output characteristics in accordance with a change in the running state; and
regulation level change means for changing said regulation level to a level corresponding to said predetermined high output characteristics before the output characteristics of said engine are switched to said predetermined high output characteristics.

7. A control system according to claim 6, wherein said output characteristic increase decide means includes means for determining the switching of the output characteristics of said engine to the high output characteristics if an engine water temperature is equal to or lower than a predetermined temperature.

8. A control system according to claim 6, wherein said output characteristic increase decide means includes means for determining the switching of the output characteristics of said engine to the high output characteristics if the depression rate of an accelerator pedal is equal to or higher than a predetermined rate.

9. A control system according to claim 6, wherein said output characteristic increase decide means includes means for determining a fuel injection time from a fundamental fuel injection time having a stoichiometric air/fuel ratio and a correction coefficient determined by a running state.

10. A control system according to claim 6, wherein said regulation level change means includes means for outputting a signal indicating the end of the change in the regulation level.

11. A control system according to claim 10, wherein said output characteristic increase decide means includes means for switching the output characteristics of said engine after it has received the signal indicating the end of the change in the regulation level.

* * * * *